(12) United States Patent
Collins (10) Patent No.: US 7,704,578 B2
(45) Date of Patent: Apr. 27, 2010

(54) DISPOSABLE ABSORBENT MAT INCLUDING REMOVABLE PORTION AND ASSOCIATED METHODS

(75) Inventor: Chadd R. Collins, Daytona Beach, FL (US)

(73) Assignee: Zionic Management, Inc., Las Vegas, NV (US)

( * ) Notice: Subject to any disclaimer, the term of this patent is extended or adjusted under 35 U.S.C. 154(b) by 281 days.

(21) Appl. No.: 11/760,467

(22) Filed: Jun. 8, 2007

(65) Prior Publication Data

US 2007/0286977 A1 Dec. 13, 2007

Related U.S. Application Data

(60) Provisional application No. 60/804,247, filed on Jun. 8, 2006.

(51) Int. Cl.
*B32B 3/10* (2006.01)
(52) U.S. Cl. .......................................... 428/43; 141/88
(58) Field of Classification Search ................... 428/43; 141/86–89, 311 A, 390
See application file for complete search history.

(56) References Cited

U.S. PATENT DOCUMENTS

| | | | | |
|---|---|---|---|---|
| 5,809,568 | A * | 9/1998 | Morris-Jones | 2/49.1 |
| 5,888,604 | A | 3/1999 | Evans, Jr. et al. | 428/47 |
| 6,178,990 | B1 * | 1/2001 | Bellenger et al. | 137/312 |
| 6,463,966 | B1 * | 10/2002 | Goodger | 141/86 |
| 6,481,478 | B2 * | 11/2002 | Mueller | 150/167 |
| 6,548,135 | B1 * | 4/2003 | Hershey et al. | 428/40.1 |
| 6,766,817 | B2 | 7/2004 | da Silva | 137/1 |
| 6,918,404 | B2 | 7/2005 | da Silva | 137/132 |
| 2006/0286334 | A1 * | 12/2006 | Harpole | 428/43 |
| 2007/0102059 | A1 * | 5/2007 | Coffman | 141/86 |

OTHER PUBLICATIONS

New Pig Catalog, "*PIG Oil-Only Mat Absorbs Oil-based Liquids without Absorbing Water*"; PIG Universal Mat, © 2007 New Pig Corporation.
Advertisement for *webBikeWorld®*, p. 1-2, www.webbikeworld.com/r2/tank-bib/tank-bib.htm, Jun. 2007.

\* cited by examiner

*Primary Examiner*—Alexander Thomas
(74) *Attorney, Agent, or Firm*—Allen, Dyer, Doppelt, Milbrath & Gilchrist, P.A.

(57) ABSTRACT

An article may be used in vehicle refueling and may include a disposable mat to be draped over a portion of the vehicle adjacent the fuel filler port. The disposable mat may include a material absorbent of vehicle fuel. The disposable mat may have a line of weakness therein defining a closed geometrically shaped removable portion to permit a user to selectively separate at least part of the removable portion from adjacent portions of the disposable mat to create a correspondingly shaped internal opening to be aligned with the fuel filler port. At least one weighted body may be temporarily coupled to the disposable mat to hold the disposable mat in position over the portion of the vehicle adjacent the fuel filler port. Since the removable portion may be left in place, the mat can also serve an additional use as an absorbent mat to wipe up spills, etc. The article may have uses other than for vehicle refueling.

26 Claims, 11 Drawing Sheets

DISPOSABLE ABSORBENT MAT INCLUDING REMOVABLE PORTION AND ASSOCIATED METHODS

RELATED APPLICATION

The present application is based upon provisional patent application Ser. No. 60/804,247 filed on Jun. 8, 2006, and the entire contents of which are incorporated herein by reference.

FIELD OF THE INVENTION

The present invention relates to the field of absorbent materials, and, more particularly, to a disposable absorbent mat, such as for vehicle refueling, and associated methods.

BACKGROUND OF THE INVENTION

General aviation aircraft, such as propeller aircraft and private jets, are typically fueled via a fuel port accessible generally on an upper surface of the plane's wing. Some fuel spillage is likely as the aviation lineman either inserts the fuel filling nozzle or withdraws it after fueling. It is generally desirable to keep the spilled fuel from contact with the plane's painted surfaces, to capture any spillage for safety and environmental reasons, and to guard against accidental paint scratching and/or other damage from contact with the fuel nozzle, fuel hose, or the fuel filler cap.

To address the spillage of fuel during aircraft refueling, many flight line personnel use a plastic or rubber mat and cut an opening therethrough to be positioned on the aircraft wing with the opening aligned with the fuel filling port. Indeed, these mats are typically improvised from car-floor mats or front-door welcome mats. Moreover, some mats may not be absorbent at all. Accordingly, spilled fuel is absorbed by the mat and the mat protects the underlying wing surface. Unfortunately, these improvised fuel spillage mats are typically relatively expensive, and require modification to form the opening. These fuel mats are used multiple times and tend to accumulate fuel and dirt and acquire an undesired odor. Such improvised mats can typically also absorb water, as well as fuel, and can quickly become relatively heavy and present a contamination/proper disposal issue.

So-called "fuel bibs" and "fuel collars" are also available for vehicles, such as boats, to slide over a fuel filler neck or a fuel nozzle to catch drips and overflow. Unfortunately such devices may be awkward to use, and may not adequately protect the adjacent vehicle surface from unintended contact, since they are typically fairly compact. Some of these fuel bibs may also comprise a material that is not absorbent of fuel, but rather that shed spilled fuel onto the adjacent ground area. This may not be desirable from an environmental impact point of view.

SUMMARY OF THE INVENTION

In view of the foregoing background, it is therefore an object of the present invention to provide a disposable absorbent mat, such as to assist in vehicle refueling and/or other similar applications.

This and other objects, features and advantages in accordance with the invention are provided by an article, such as for use in vehicle refueling for a vehicle having a fuel filler port on a upper portion thereof. The article may comprise a disposable mat to be draped over the portion of the vehicle adjacent the fuel filler port, and the disposable mat may comprise a material absorbent of fuel. Moreover, the disposable mat may have a line of weakness therein defining a closed geometrically shaped removable portion to permit a user to selectively separate at least part of the closed geometrically shaped removable portion from adjacent portions of the disposable mat to create a correspondingly shaped internal opening in the disposable mat to be aligned with the fuel filler port. Since the removable portion may be left in place, the mat can also serve an additional use as an absorbent mat to wipe up spills, etc. The types of vehicles benefiting from the article may include aircraft, boats, and motorcycles, for example. Of course, the article may have uses other than for vehicle refueling.

The article may also include at least one weighted body temporarily coupled to the disposable mat to hold the disposable mat in position over the portion of the vehicle adjacent the fuel filler port. The weighted body may be reused with other disposable mats in subsequent refueling operations. The use of the weighted body or bodies may be especially helpful where wind is present that would otherwise disturb the positioning of the disposable mat.

The closed geometrically shaped removable portion may be in the shape of a circle, such as having a diameter in the range of 4 to 5 inches, for example. The closed geometrically shaped removable portion may also be offset from a center of the disposable mat to provide enhance flexibility of use. In addition, the disposable mat may further have a vertical line of weakness extending in a vertical direction so as to define two adjacent side-by-side panels selectively separable from each other.

The material absorbent of vehicle fuel, or other petroleum-based liquids, may comprise polypropylene, for example. The material may also be non-absorbent of water, however, in other embodiments it may desirably be absorbent of water. The disposable mat may also comprise a treatment to reduce static electricity discharge.

In some embodiments, the line of weakness may be discontinuous so as to define an attachment flap between the closed geometrically shaped removable portion and adjacent portions of the disposable mat. The line of weakness may comprise a series of at least partial slits in the disposable mat, for example.

A method aspect is for refueling a vehicle having a fuel filler port on a portion thereof. The method may comprise draping a disposable mat over the portion of the vehicle adjacent the fuel filler port, the disposable mat comprising a material absorbent of vehicle fuel, the disposable mat also having a line of weakness therein defining a closed geometrically shaped removable portion. The method may further include selectively separating at least part of the closed geometrically shaped removable portion from adjacent portions of the disposable mat to create a correspondingly shaped internal opening in the disposable mat aligned with the fuel filler port. Of course, the method may also include fueling the vehicle and disposing of the disposable mat.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in alternative embodiments.

Figure 1:
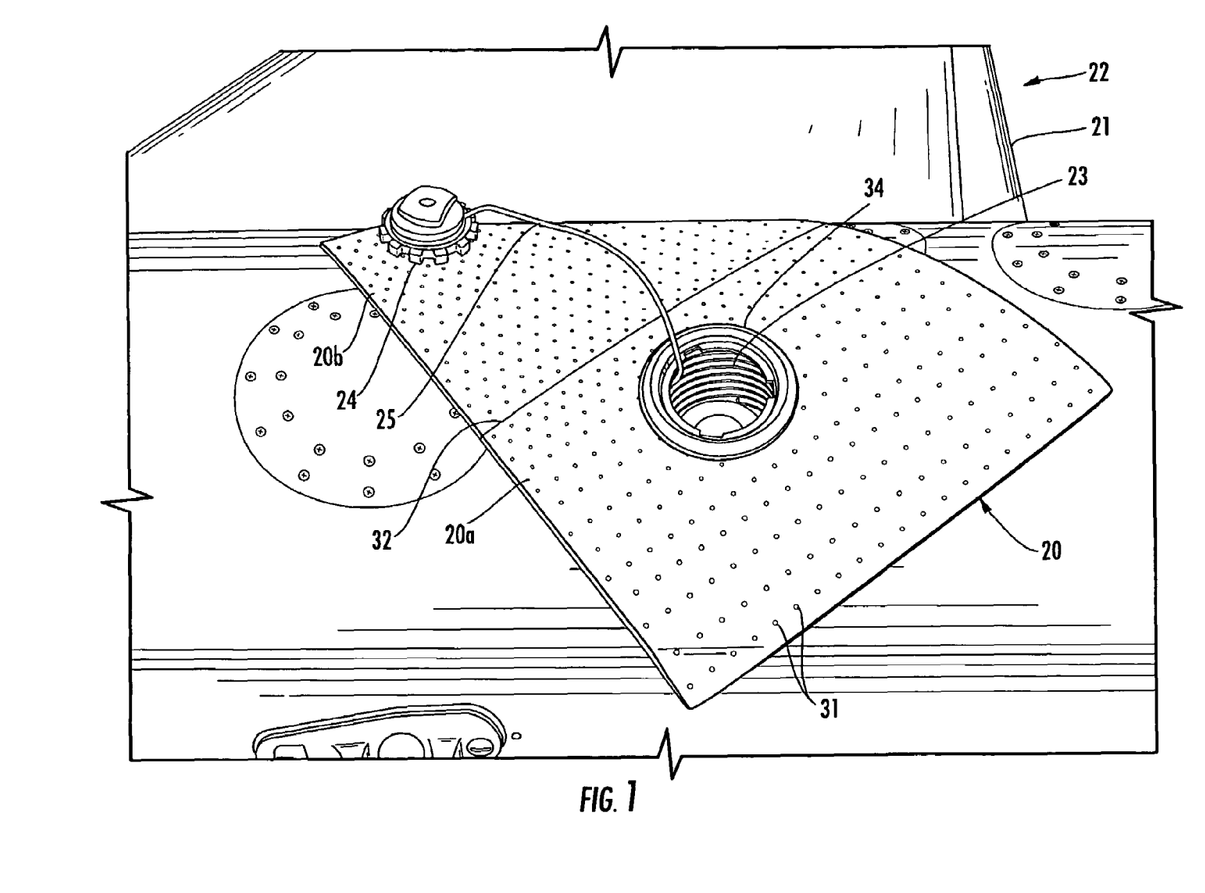
FIG. 1 is a perspective view of the disposable absorbent mat positioned adjacent an aircraft fuel filler port in accordance with the invention.
Figure 2:
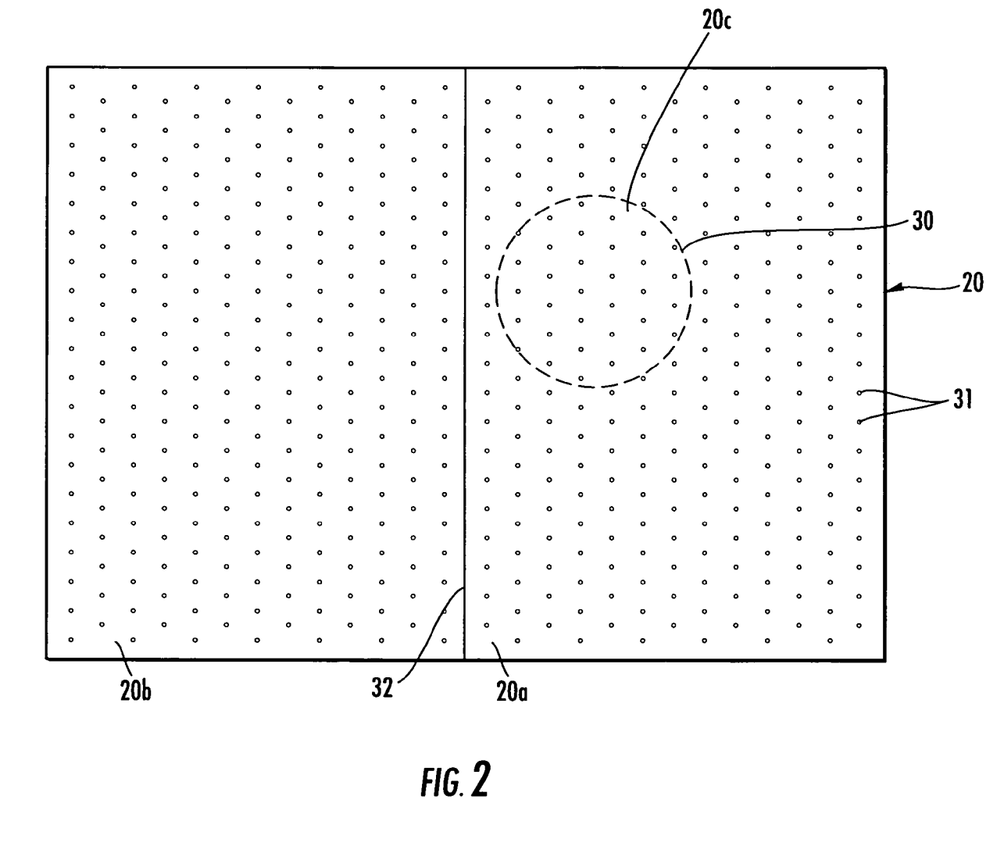
FIG. 2 is a plan view of the absorbent mat as shown in FIG. 1 with the removable portion still in place.
Figure 3:
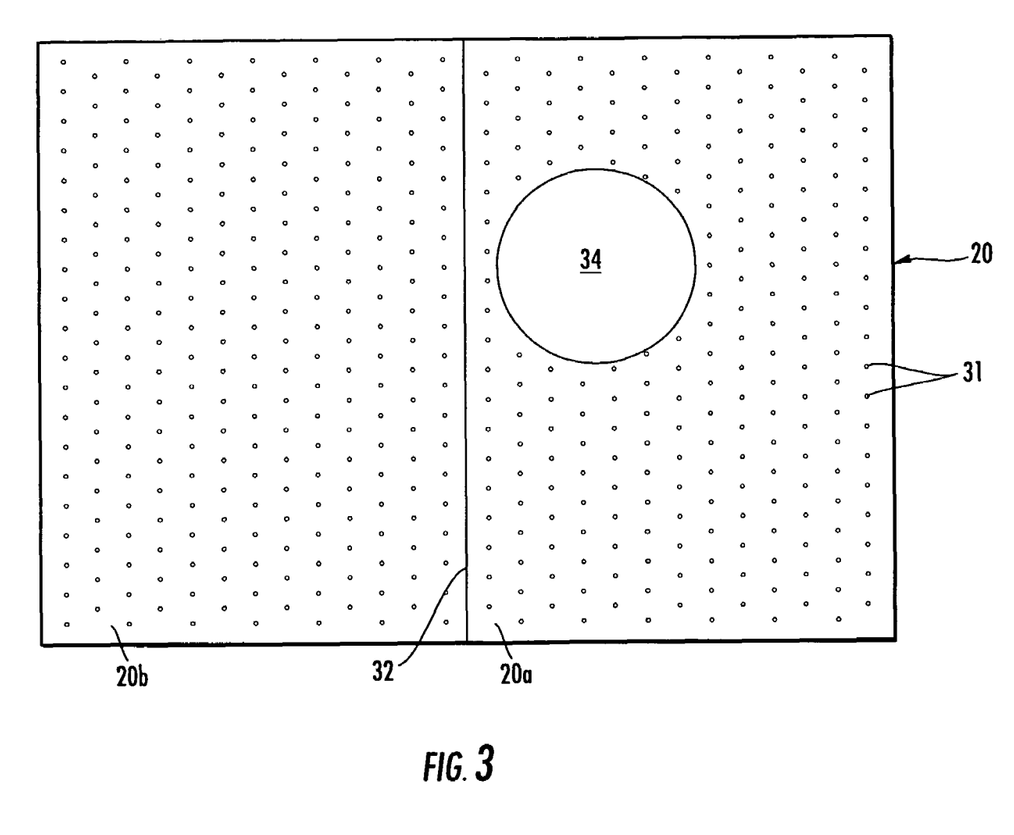
FIG. 3 is a plan view of the absorbent mat as shown in FIG. 1 with the removable portion already fully removed.

Referring initially to FIGS. 1-3, the disposable absorbent mat 20 in accordance with the invention is now described. The mat 20 is illustratively draped over the wing 21 of the aircraft 22 adjacent the fuel filler port 23. The fuel cap 24 is shown removed from the port 23, but still attached via the illustrated tether 25. Of course, in some embodiments, a tether may not be used, however, it is still common for the lineman to position the fuel cap close to the port 23 when refueling the aircraft 22 as will be appreciated by those skilled in the art. The mat 20 is preferably sized to provide working room for the flight line technician to remove the cap 24, position the cap near the port 23, and manipulate the fuel nozzle (not shown) into and out of the fuel filler port.

The mat 20 illustratively includes a pair of side-by-side panels 20a, 20b joined together at a vertical line of weakness 32. This vertical line of weakness 32 is optional and is not needed in other embodiments. The vertical line of weakness 32 permits the user to tear the mat 20 into smaller portions, such as for smaller spills. The mat 20 also illustratively includes an array of attachment points 31 where multiple plies of material may be tacked together during manufacturing as will be appreciated by those skilled in the art.

The disposable absorbent mat 20 illustratively includes a circular line of weakness 30 (FIG. 2) that permits the user to selectively remove, such as by tearing or punching out, the circular removable portion 20c from its associated panel 20a. In other embodiments, the line of weakness 30 for the removable portion 20c could have other closed geometric shapes, such as polygonal, oval, etc. It is generally desired that the line of weakness 30 be interior to the edges of the mat 20 so that at least a portion of the mat still remains to surround the fuel port 23 after removal of the removable portion 20c. In other words, the removable portion 20c is integral to the mat 20.

For convenience for fuel filling, the removable portion 20c and its associated line of weakness 30 may be circular, as illustrated, and may have a diameter in a range of 4 to 5 inches as seen in FIG. 3. The mat 20 may have a width of about 20 inches, with each panel 20a, 20b having a 10 inch width. The mat 20 may also have a height of about 15 or 16 inches. Of course other dimensions are also contemplated and may be used.

The illustrated line of weakness 30 and resulting removable portion 20c are illustratively positioned offset from an exact center of the mat 20. In other terms, the line of weakness 30 and removable portion 20c may be considered as being located in a quadrant of the mat 20. This positioning permits a lineman to use the mat 20 to protect the wing 21 from dents and scratches from the fuel cap 24 and/or fueling nozzle and hoses as is a common concern while fueling the aircraft 22. In addition, should some fuel spill, the lineman would already have the mat 20 to clean up the spill without having to obtain and use a separate rag, for example. After fueling is complete, the lineman can simply replace the cap 24 and wipe away any residual fuel with the mat 20. Of course, the mat 20 may be relatively inexpensive and readily disposed of. It is feasible to always use a new mat 20 or nearly new mat that is clean and dry. The other improvised mats described above in the Background of the Invention section are repeatedly used and therefore can retain fuel that is spilled and soak up dirt over time and may actually cause more damage to the aircraft with each use.

Figure 4:
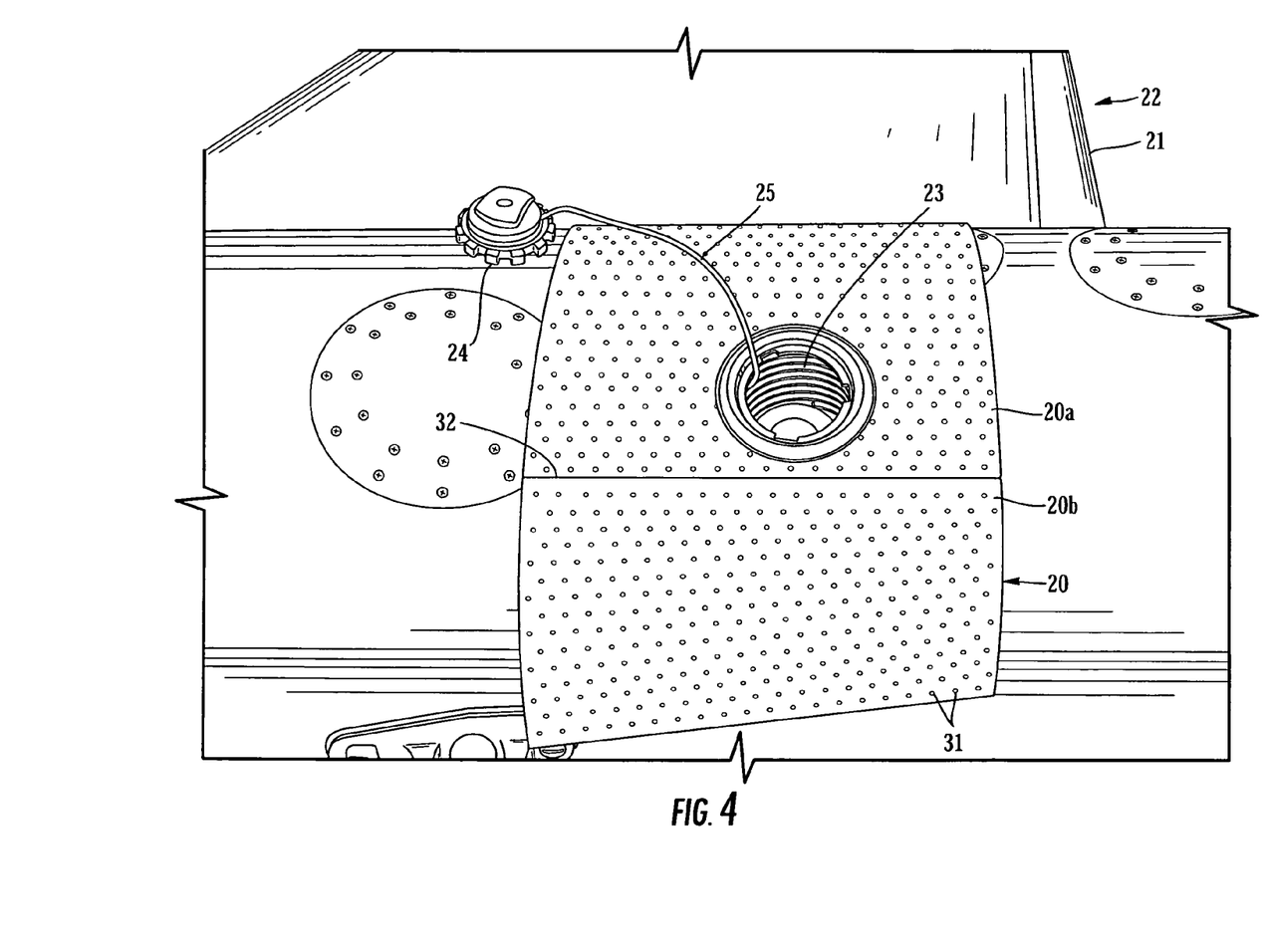
FIG. 4 is a perspective view of the disposable absorbent mat as shown in FIG. 1, but in another position relative to the aircraft fuel filler port.
Figure 5:
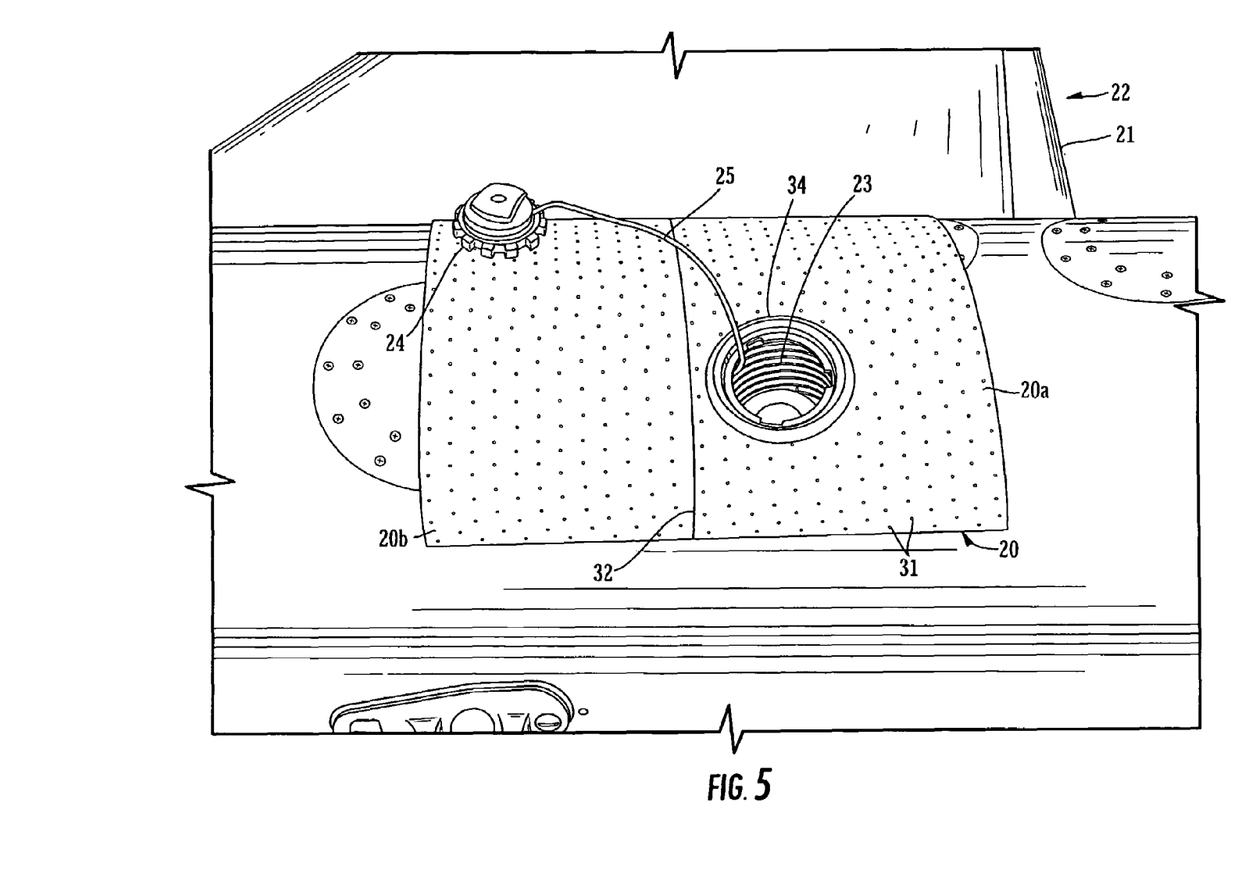
FIG. 5 is a perspective view of the disposable absorbent mat as shown in FIG. 1, but in still another position relative to the aircraft fuel filler port.
Figure 6:
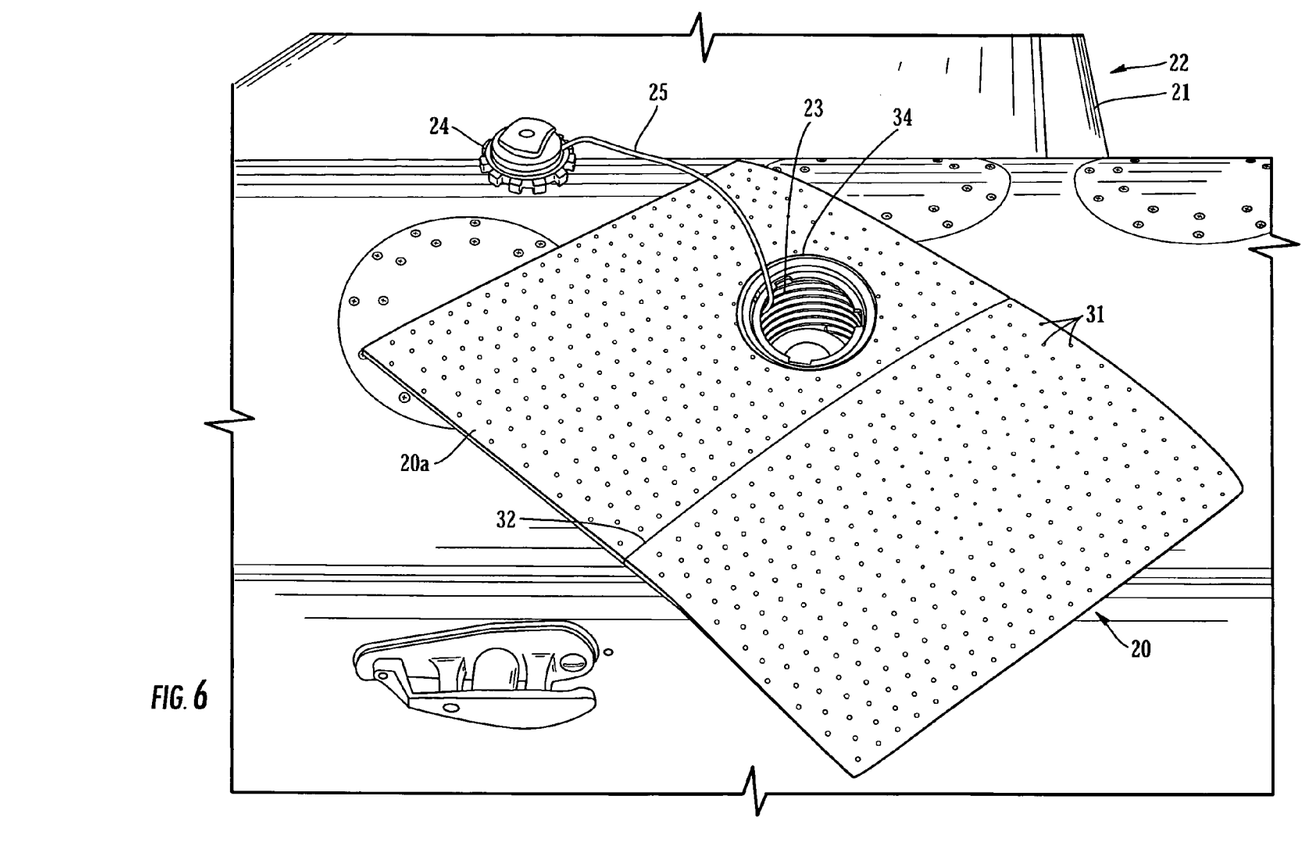
FIG. 6 is a perspective view of the disposable absorbent mat as shown in FIG. 1, but in yet another position relative to the aircraft fuel filler port.
Figure 7:
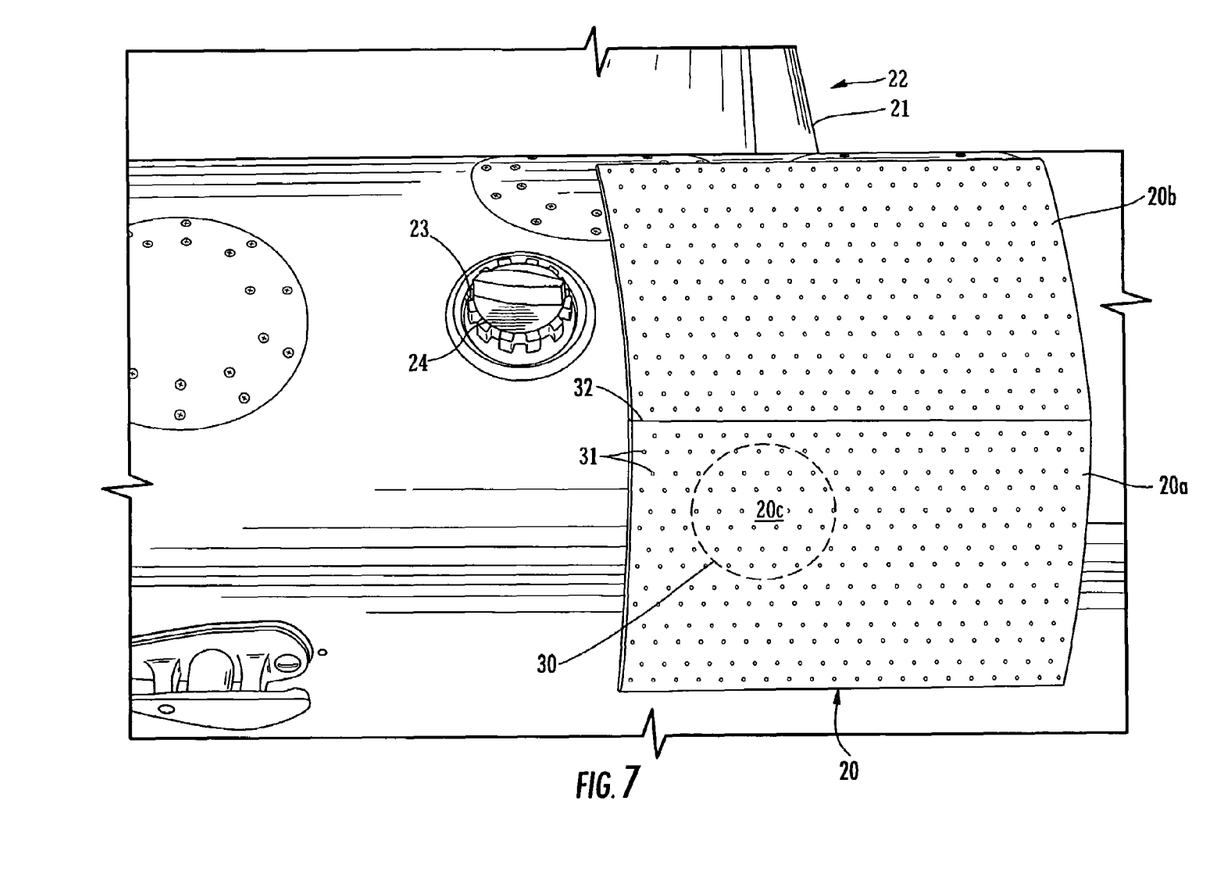
FIG. 7 is a perspective view of the disposable absorbent mat as shown in FIG. 1 on the aircraft wing and without removal of the removable portion.

The line of weakness 30 and its associated removable portion 20c allow use of the mat 20 as a conventional petroleum mat or if desired, as an aircraft fueling mat by simply punching or tearing out the removable portion 20c. By having the removable portion 20c offset to one quadrant on the mat 20, it allows the mat to be extremely adaptable and functional for a host of different aircraft as the fueling points are located in variety of locations and while still providing aircraft surface protection and serving as a fuel-spill catching device. With additional reference to FIGS. 4-6 additional positioning options for the mat 20 are illustrated, although those of skill in the art will appreciate many more. The mat 20 being used without removable of the removable portion 20c is also shown in use in FIG. 7. The mat 20 provides the aviation community with a cleaner, dryer, safer, cheaper, and more efficient way to protect an aircraft 22 and the environment when fuel is being added to an aircraft.

In particular, the mat 20 may be advantageously made from a PIG® Stat-Mat® Absorbent—Light-weight mat sold under designation the MAT215 and available from New Pig of Tipton, Pa. Such a mat is described as a light-weight absorbent pad designed to float on water while absorbing only petroleum derived fluids such as oil, gasoline, kerosene, diesel fuel, etc. It is treated to dissipate static electricity for added safety in flammable vapor environments. As noted in the product literature, the main function of the PIG® STAT-MAT® Pad is to remove hydrocarbons from waterways such as ponds, lakes or lagoons. Since they float, the pads stay in contact with the contaminant. The fast-wicking capability and large surface area ensure a quick cleanup. The pads absorb petroleum-based liquids, but no water, and are also packaged in special static-dissipative bags to deter a static charge during transportation. The mats are made of 100% polypropylene. Further details regarding suitable starting mats are disclosed in U.S. Pat. Nos. 5,888,604 and 6,548,135, for example, the entire contents of which are incorporated herein by reference. Other pads, rolls or dispenser boxes of similar products from New Pig or other manufacturers can also be used. In addition, in yet other embodiments, it may be desirable to use a pad also being absorbent of water as will be appreciated by those skilled in the art.

As will be readily be appreciated by those skilled in the art, the mat 20 in accordance with the invention may be readily manufactured by the addition of the line of weakness 30 as described above. Indeed, those skilled in the art will appreciate that the line of weakness 30 may be formed with a number of techniques, both manual and adapted for automation, such as forming a series of spaced slits or partial slits in the mat.

Figure 8:
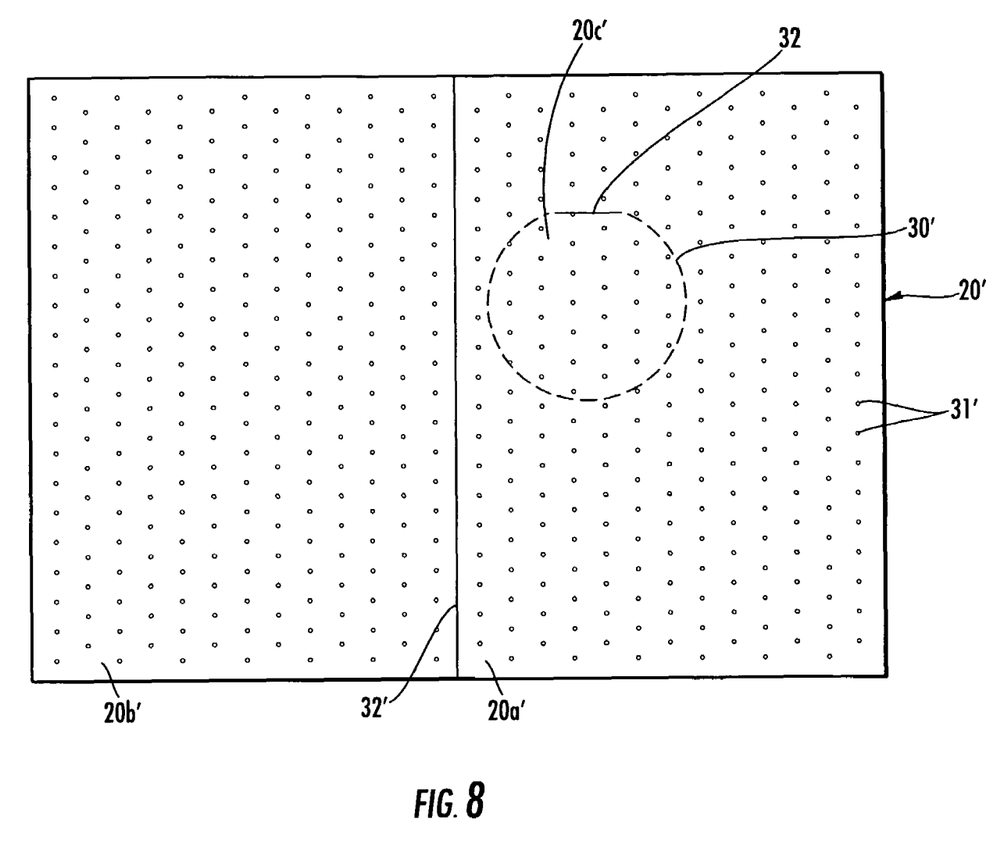
FIG. 8 is a plan view of an alternative embodiment of an absorbent mat with the removable portion still in place.
Figure 9:
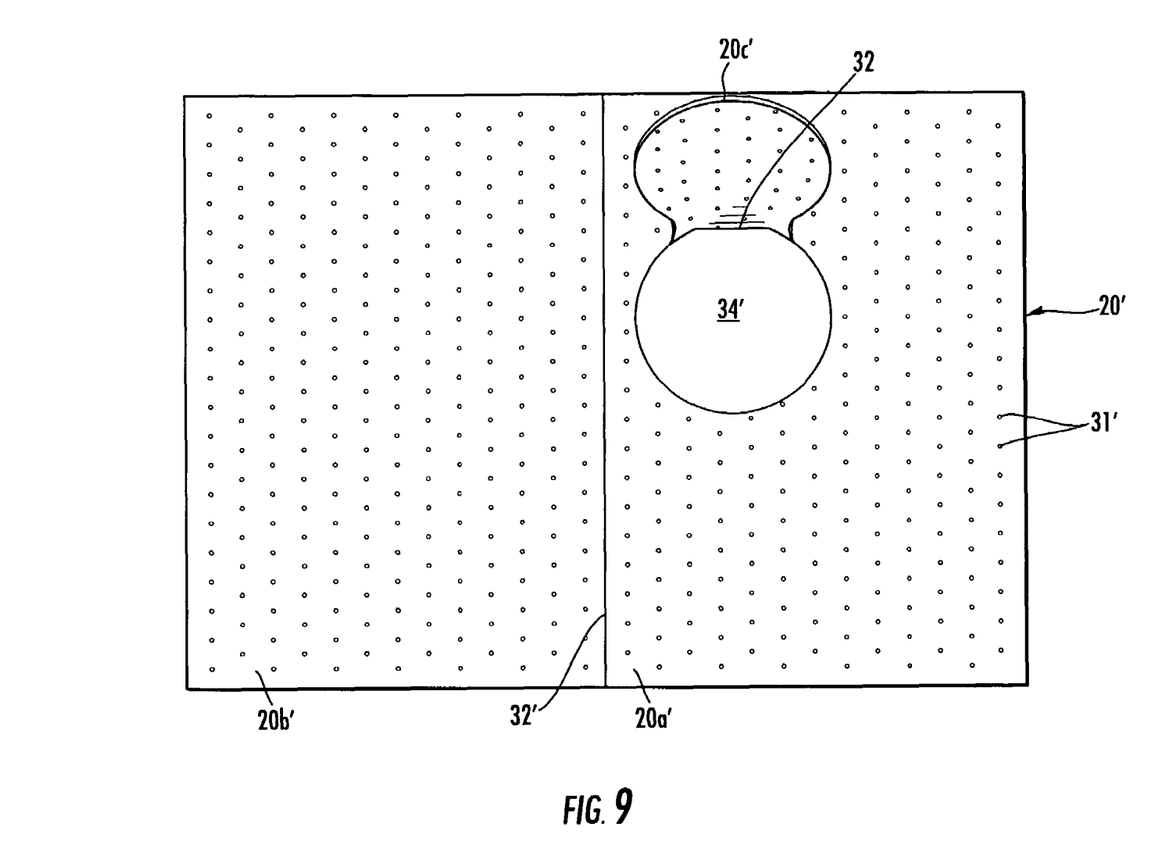
FIG. 9 is a plan view of the absorbent mat as shown in FIG. 8 with the removable portion folded back, that is, only partially removed.

Referring now additionally to FIGS. 8 and 9, an alternative embodiment of the absorbent mat 20' is now described. In this embodiment, the line of weakness 30' is not formed to define a complete circle. Rather, a portion 32 of the line of weakness 30' is left intact so that the removable portion 20c' is only partially removable and can be folded back or under as perhaps best seen in FIG. 9. Accordingly, the removable portion 20c' need not be disposed of separately, and remains with the mat 20' to be disposed of simultaneously therewith. In other words, the line of weakness 30' is discontinuous to define an attachment flap. Those of skill in the art will appreciate that it is desirable to keep debris or other objects from accidentally falling into the fuel filler or even onto the runway or maintenance areas of an airport.

Figure 10:
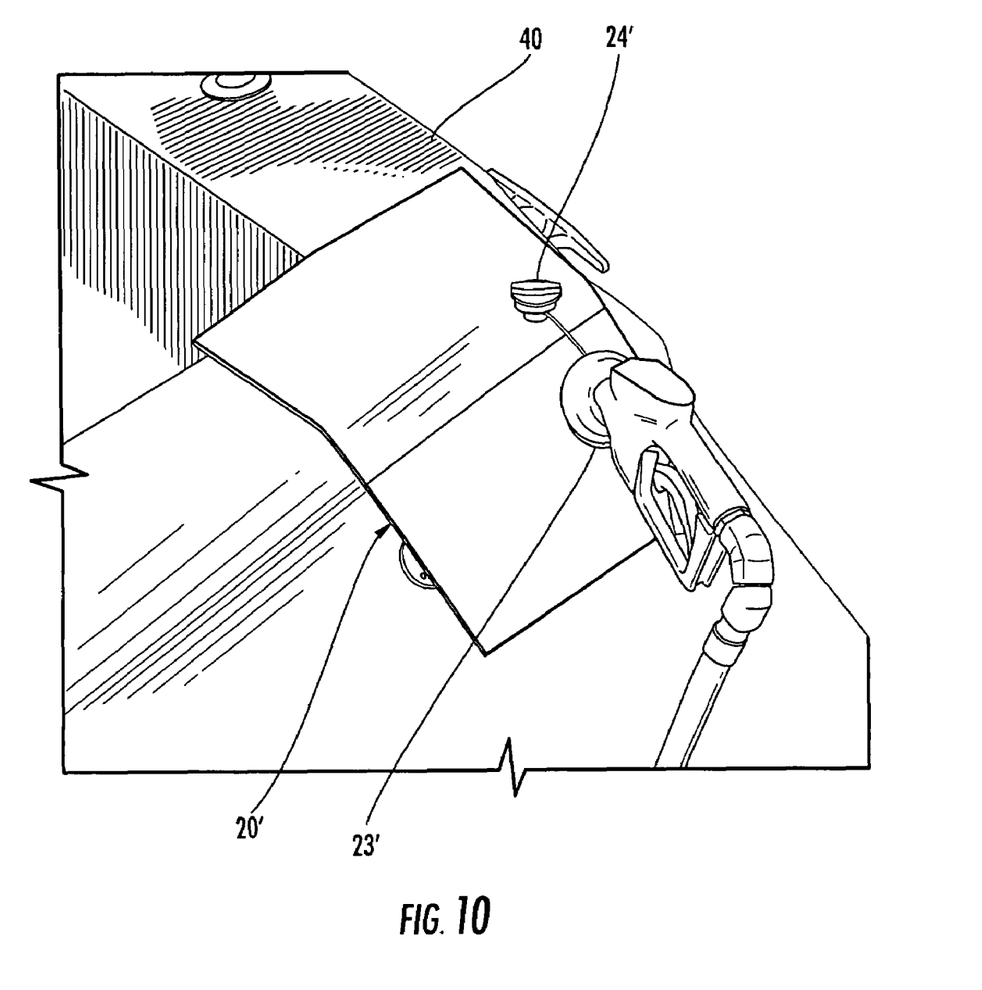
FIG. 10 is a perspective view of the disposable absorbent mat as shown in FIG. 8, but being used for boat refueling.

Referring now to FIG. 10, another application of the disposable mat 20' is now described. The mat 20' is positioned on a portion of a boat 40 adjacent the fuel filler port 23'. The removable portion is tucked back underneath the adjacent portions of the mat 20' so as not to be visible. The fuel filler cap 24' is positioned on the mat 20' as shown in the illustrated embodiment, and the fuel nozzle 41 is positioned extending into the fuel filler port 23'. The advantages and features as described above for refueling an aircraft similarly apply to refueling a boat 40 as will be appreciated by those skilled in the art. For example, the mat 20' is helpful to keep fuel out of the waterway, and protect the boat finish. Those skilled in the art will appreciate that the mat 20' may be used for refueling other vehicles as well, such as motorcycles, etc.

Figure 11:
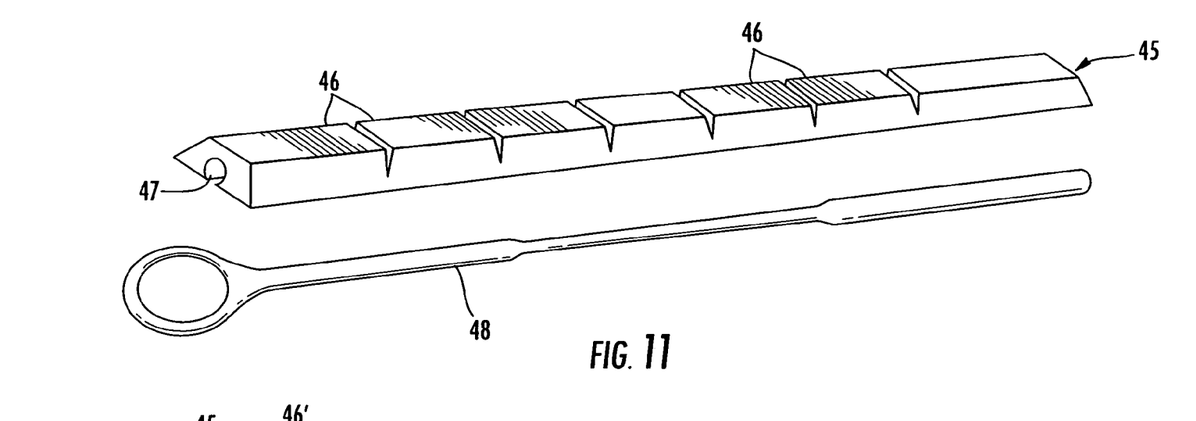
FIG. 11 is a perspective view of a weighted body and associated spline rod for temporarily retaining the disposable mat in accordance with the present invention.
Figure 12:
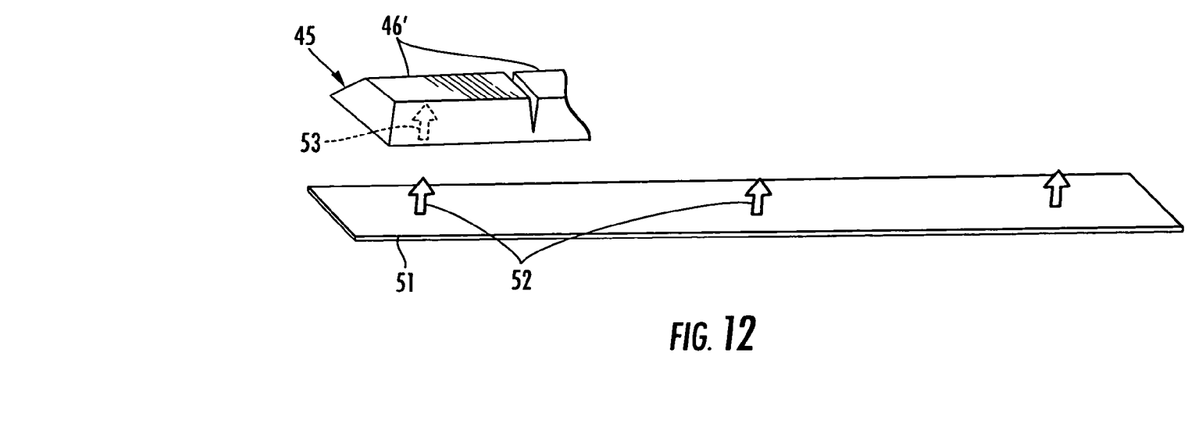
FIG. 12 is a perspective view of another embodiment of a weighted body and associated spike strip for temporarily retaining the disposable mat in accordance with the present invention.

Referring now additionally to FIGS. 11 and 12 another advantageous feature is now described. Since the disposable mat described above is relatively lightweight, its position may tend to be disturbed by wind, for example. Accordingly, one or more weighted bodies may be supplied and temporarily coupled to the mat to temporarily hold it in position adjacent the portion of the vehicle adjacent the fuel filler port. More particularly, as shown in FIG. 11, the weighted body 45 may be formed of a series of joined together segments 46 that provide some flexibility to the body to permit it to conform to the underlying vehicle portion. The weighted body 45 also includes a slotted opening 47 that is sized to receive a mating spline rod 48 therein to trap an edge of the mat (not shown) therebetween. It may be preferred in some applications to use a pair of such weighted bodies 45 and mating spline rods 48 at opposing edges of the mat. Indeed, after or prior to refueling, the mat may be wound in a scroll-like fashion using one or more the weighted bodies. The weighted body 45 may typically have a weight of about 1.5 to 2.0 pounds, although other sizes are also possible.

Referring now additionally to FIG. 12, another variation of the weighted body 45' is now described. In this variation, the weighted body 45' also includes the series of segments 46', but the attachment arrangement is slightly different. A mating strip 51 include a series of upstanding spikes 52 that pierce the mat and are received in corresponding passageways 53 in the weighted body 45'.

The weighted bodies 45, 45' may also be made of a suitable material that is also resistant to fuel or other petroleum-based liquids. Of course, those of skill in the art will appreciate other configurations of temporarily attachable weighted bodies that may be used in conjunction with the disposable mats as described herein.

The mat embodiments described herein may be shipped and stored in a roll form or a tablet form. In the roll form, the mats are connected in series around a tubular form, for example. In the tablet form, a plurality of stacked mats are shipped and stored with a temporary binder adjacent one edge, and from which individual mats may be readily removed as will be appreciated by those skilled in the art. Accordingly, many modifications and other embodiments of the invention will come to the mind of one skilled in the art having the benefit of the teachings presented in the foregoing descriptions and the associated drawings. Accordingly, it is understood that the invention is not to be limited to the embodiments disclosed, and that other modifications and embodiments are intended to be included within the scope of the following claims.

That which is claimed is:

1. An article for use in vehicle refueling for a vehicle having a fuel filler port on a portion thereof, the article comprising:
    a disposable mat to be draped over the portion of the vehicle adjacent the fuel filler port;
    said disposable mat comprising a material absorbent of fuel;
    said disposable mat having a line of weakness therein defining a closed geometrically shaped removable portion to permit a user to selectively separate at least part of the closed geometrically shaped removable portion from adjacent portions of said disposable mat to create a correspondingly shaped internal opening in the disposable mat to be aligned with the fuel filler port;
    the line of weakness being discontinuous so as to define an attachment flap between said closed geometrically shaped removable portion and adjacent portions of said disposable mat;
    at least one weighted body temporarily coupled to said disposable mat to hold said disposable mat in position over the portion of the vehicle adjacent the fuel filler port.

2. The article according to claim 1 wherein the closed geometrically shaped removable portion is in the shape of a circle.

3. The article according to claim 1 wherein the closed geometrically shaped removable portion is offset from a center of the disposable mat.

4. The article according to claim 1 wherein said disposable mat further has a vertical line of weakness extending in a vertical direction so as to define two adjacent side-by-side panels selectively separable from each other.

5. The article according to claim 1 wherein said material absorbent of fuel comprises polypropylene.

6. The article according to claim 1 wherein said material absorbent of fuel is also nonabsorbent of water.

7. The article according to claim 1 wherein said disposable mat also comprises a treatment to reduce static electricity discharge.

8. An article comprising:
    a disposable mat comprising a material absorbent of petroleum-based liquids;

said disposable mat having a line of weakness therein defining a closed geometrically shaped removable portion to permit a user to selectively separate at least part of the closed geometrically shaped removable portion from adjacent portions of said disposable mat to create a correspondingly shaped internal opening in said disposable mat;

the line of weakness being discontinuous so as to define an attachment flap between said closed geometrically shaped removable portion and adjacent portions of said disposable mat;

at least one weighted body temporarily coupled to said disposable mat to hold said disposable mat in a desired position.

9. The article according to claim 8 wherein the closed geometrically shaped removable portion is in the shape of a circle.

10. The article according to claim 8 wherein the closed geometrically shaped removable portion is offset from a center of the disposable mat.

11. The article according to claim 8 wherein said disposable mat further has a vertical line of weakness extending in a vertical direction so as to define two adjacent side-by-side panels selectively separable from each other.

12. The article according to claim 8 wherein said material absorbent of petroleum-based liquids comprises polypropylene.

13. The article according to claim 8 wherein said material absorbent of petroleum-based liquids is also nonabsorbent of water.

14. The article according to claim 8 wherein said disposable mat also comprises a treatment to reduce static electricity discharge.

15. An article comprising:
   a disposable mat comprising a material absorbent of petroleum-based liquids;
   said disposable mat having a line of weakness therein defining a closed geometrically shaped removable portion to permit a user to selectively separate at least part of the closed geometrically shaped removable portion from adjacent portions of said disposable mat to create a correspondingly shaped internal opening in said disposable mat;
   the line of weakness being discontinuous so as to define an attachment flap between said closed geometrically shaped removable portion and adjacent portions of said disposable mat;
   the closed geometrically shaped removable portion being in the shape of a circle.

16. The article according to claim 15 wherein the closed geometrically shaped removable portion is offset from a center of the disposable mat.

17. The article according to claim 15 wherein said disposable mat further has a vertical line of weakness extending in a vertical direction so as to define two adjacent side-by-side panels selectively separable from each other.

18. The article according to claim 15 wherein said material absorbent of petroleum-based liquids comprises polypropylene.

19. An article comprising:
   a disposable mat comprising a material absorbent of petroleum-based liquids;
   said disposable mat having a line of weakness therein defining a closed geometrically shaped removable portion to permit a user to selectively separate at least part of the closed geometrically shaped removable portion from adjacent portions of said disposable mat to create a correspondingly shaped internal opening in said disposable mat;
   the line of weakness being discontinuous so as to define an attachment flap between said closed geometrically shaped removable portion and adjacent portions of said disposable mat;
   said material absorbent of petroleum-based liquids also being nonabsorbent of water.

20. The article according to claim 19 wherein the closed geometrically shaped removable portion is offset from a center of the disposable mat.

21. The article according to claim 19 wherein said disposable mat further has a vertical line of weakness extending in a vertical direction so as to define two adjacent side-by-side panels selectively separable from each other.

22. The article according to claim 19 wherein said material absorbent of petroleum-based liquids comprises polypropylene.

23. An article comprising:
   a disposable mat comprising a material absorbent of petroleum-based liquids;
   said disposable mat having a line of weakness therein defining a closed geometrically shaped removable portion to permit a user to selectively separate at least part of the closed geometrically shaped removable portion from adjacent portions of said disposable mat to create a correspondingly shaped internal opening in said disposable mat;
   the line of weakness being discontinuous so as to define an attachment flap between said closed geometrically shaped removable portion and adjacent portions of said disposable mat;
   said disposable mat also comprising a treatment to reduce static electricity discharge.

24. The article according to claim 23 wherein the closed geometrically shaped removable portion is offset from a center of the disposable mat.

25. The article according to claim 23 wherein said disposable mat further has a vertical line of weakness extending in a vertical direction so as to define two adjacent side-by-side panels selectively separable from each other.

26. The article according to claim 23 wherein said material absorbent of petroleum-based liquids comprises polypropylene.

* * * * *